United States Patent [19]

Kindersley

[11] 4,260,131
[45] Apr. 7, 1981

[54] LOW AND HIGH OPERATING TEMPERATURES VALVE

[75] Inventor: Peter G. Kindersley, Glens Falls, N.Y.

[73] Assignee: Kamyr Valves, Inc., Glens Falls, N.Y.

[21] Appl. No.: 946,374

[22] Filed: Sep. 27, 1978

[51] Int. Cl.³ .............................................. F16K 5/06
[52] U.S. Cl. .................................. 251/214; 251/315; 251/368
[58] Field of Search .................. 251/315, 214, 368

[56] References Cited

U.S. PATENT DOCUMENTS

| 3,049,868 | 8/1962 | Adams, Jr. et al. | 251/315 |
|---|---|---|---|
| 3,083,945 | 4/1963 | Shafer et al. | 251/315 |
| 3,151,837 | 10/1964 | Bentley-Leek | 251/315 |
| 3,155,368 | 11/1964 | Shafer | 251/315 |
| 3,161,204 | 12/1964 | Roy, Sr. | 251/315 |
| 3,164,362 | 1/1965 | Laviguer | 251/214 |
| 3,272,473 | 9/1966 | Veit et al. | 251/315 |
| 3,336,938 | 8/1967 | Schenck, Jr. | 251/315 |
| 3,445,087 | 5/1969 | Priese et al. | 251/315 |
| 3,528,448 | 9/1970 | Urban | 251/315 |
| 3,819,150 | 6/1974 | Kajrup | 251/315 |
| 3,949,965 | 4/1976 | Sharples et al. | 251/315 |
| 4,006,881 | 2/1977 | Gaillard | 251/315 |
| 4,103,867 | 8/1978 | Orr | 251/315 |
| 4,111,393 | 9/1978 | McClurg et al. | 251/315 |

FOREIGN PATENT DOCUMENTS

| 1600668 | 3/1970 | Fed. Rep. of Germany | 251/315 |
|---|---|---|---|
| 2325112 | 12/1974 | Fed. Rep. of Germany | 251/315 |
| 1274893 | 9/1961 | France | 251/315 |
| 1369500 | 7/1964 | France | 251/315 |

Primary Examiner—Martin P. Schwadron
Assistant Examiner—H. Jay Spiegel
Attorney, Agent, or Firm—Cushman, Darby & Cushman

[57] ABSTRACT

A ball valve assembly that is uniquely suited for use in extremely high and low temperature applications where solid particles are frequently present within a flowing fluid. The valve includes a one-piece ball and stem or shaft element and the bore of that ball together with separate, removable end members, inserted from opposite directions into a passage extending through the valve body, form the valve's fluid-flow path. The valve body includes a second bore which can either extend through the entire valve body, perpendicularly with the other passageway, or can instead extend perpendicularly from that passageway to the exterior of the valve body in only one direction. The ball stem is rotatably retained and sealed in this second bore and the bore is dimensioned so as to be at least as large as the diameter of the ball so that the ball can be removed therethrough. In one embodiment the inner ends of the separate end members forming part of the fluid flow path are shaped to correspond to the exterior shape of the ball and contain a solid seat and a solid elastically compressible behind-the-seat seal. In another embodiment in-line removal of the ball and stem element is possible due to the use of separate cylindrical sealing elements positioned between the ball which also form part of the flow passage and seal the area between the ball and end members. The mating surfaces of the end members and the cylindrical elements are curved in a cooperating fashion to allow the cylindrical elements to rotate around the end members into a recess located in the valve body so that the ball can easily be removed through the second bore.

28 Claims, 6 Drawing Figures

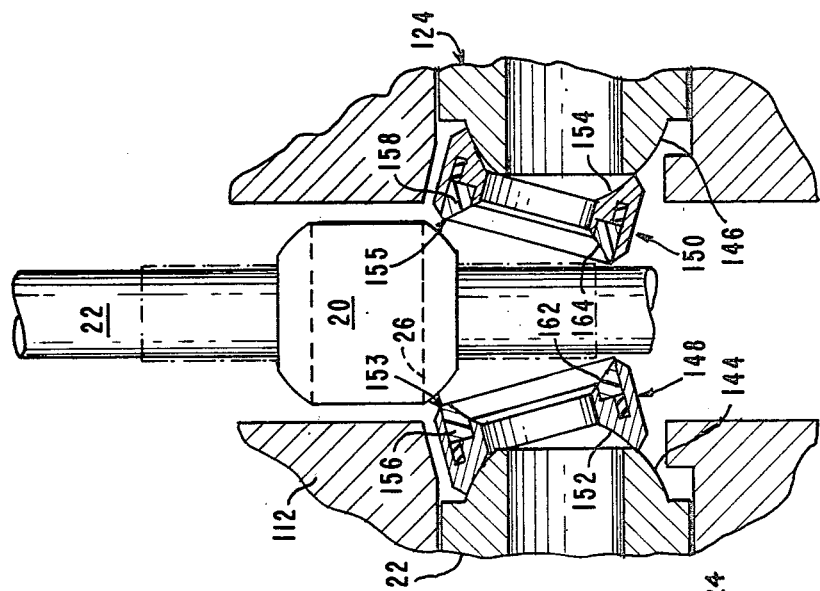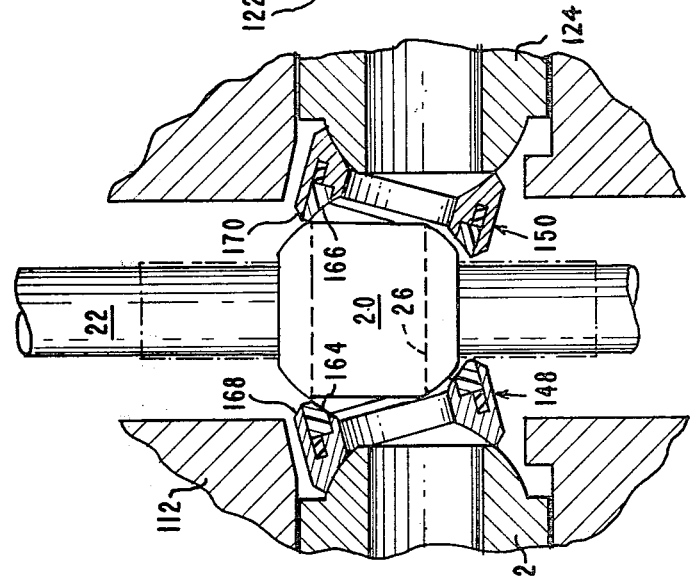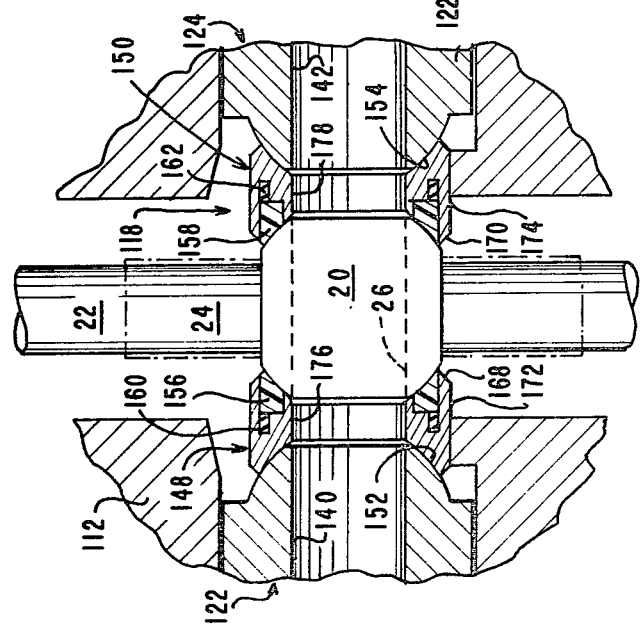

LOW AND HIGH OPERATING TEMPERATURES VALVE

BACKGROUND AND SUMMARY OF THE INVENTION

As is now known in the valve art, use of a one-piece ball and shaft element in ball valves not only simplifies construction of the valve and the valve body or housing but also solves many problems associated with sealing the area therebetween and maintaining a fixed relationship between the ball and shaft.

It is also known that valves having a one-piece ball and shaft construction are advantageous since backlash and deadband problems do not occur when trying to accurately position the ball for use as a flow control valve since there is no possibility of dead spaces being created in the joint as might occur with a separate ball and shaft construction.

The present invention also relates to ball valve assemblies which are particularly useful in extremely high and low temperature environments and one embodiment allows easy in-line servicing of the ball and valve seats.

As examples of prior known devices incorporating one-piece ball and stem arrangements reference can be made to U.S. Pat. No. 3,445,087 and Canadian Pat. No. 978,172.

As indicated above, it is extremely desirable to have ball valve assemblies which are useful in environments having both very high and very low temperature conditions. However, there are several known problems in these use areas. The major difficulties relate to thermal expansion and contraction which requires the proper fitting of parts under highly varying temperature conditions and the proper sealing of body openings and joints. When reference is made to very high and very low temperatures very high temperatures are considered to be those ranging between 1000° to 2000° F. while very low temperatures are considered to be those below −100° F.

Another major problem which can affect the long term functioning of ball valves, especially in very high temperature applications, relates to the presence of abrasive solids in the fluid whose flow is being controlled. Gases resulting from combustion processes often include fly ash and in the minerals or mining industries mineral ore solids or coal or char particles can often times be entrained within the flowing gas or fluid resulting from such operations. Accordingly, it is highly desirable to have a valve construction that allows for the presence of abrasive solids within the flowing fluid so that the valve will not be affected by their presence.

The present invention provides a convenient solution to each of the above difficulties and in addition exhibits a structure that allows for much improved and easier serviceability including improved in-line servicing of the ball and stem element as well as the internal seals directly engaging the ball.

The present invention also provides a ball valve assembly that includes excellent sealing capabilities between the ball and the valve body or in particular between the ball and separate elements inserted within the valve body which form together with the ball the fluid flow path.

The present invention also makes use of solid form springs behind the bearings and solid elastically compressible behind the seat seals which assures that the cavity behind the bearings and the valve seats are filled with a solid material so that additional solids cannot enter and cause difficulties. Also, use of solid springs behind the bearings assures that those bearings are continuously thrust inwards onto the ball thereby preventing solids from entering between shaft and inside bore of the bearing while at the same time completely filling the space they occupy so that additional solids cannot enter.

The present invention is set forth herein in the form of two embodiments, the first not being serviceable in-line and a second having full in-line serviceability of the ball and stem element as well as the valve seats.

Both embodiments employ a one-piece valve body structure which includes preferably two perpendicularly positioned cross bores therethrough. It is preferable that these cross bores are centrally located in the valve body but it should be understood that it is essential that only one of these bores be a through bore so that the second bore could extend perpendicularly from that through bore to the outside of the valve body in only one direction. Of course in this latter case the ball would have only one stem or shaft disposed in that second bore. Each ball stem element is provided with a trunnion bearing and the ball and stem structure is suitably supported in the valve body by annular enclosing and sealing elements which both rotatably support and seal the ball stem. In each instance, the bore or opening in which the ball stem is incorporated is concentric with respect to the axis of rotation of that ball stem and is dimensioned so as to be at least as large or larger than the diameter of the ball element itself. Further, in the second embodiment the bore in which the ball stem is positioned is also large enough to allow removal of the valve seats.

Each embodiment includes separate, end members, preferably identical, which are inserted into opposite sides of the bore extending through the valve body and which form, together with the bore the ball element, the fluid conducting passage in the ball valve assembly. These end members can be turned or machined parts which also simplifies construction. In the first embodiment, the end members include inner end portions shaped in a cooperative and corresponding fashion with the shape of the outer surface of the ball to facilitate effective and complete sealing of the flow path through the valve. To complete that seal, the inner end of each end member is provided with an annular valve seat constructed from a solid material such as metal, or a synthetic resin such as polytetrafloroethylene.

In the second embodiment, the portion of each end member which extends into the valve body is foreshortened and provided with a convex, generally spherically shaped inner end. A separate cylindrical extension member is disposed between the spherical inner end of each end member and the ball element so as to also form a link in and part of the valve's flow path. The valve body itself is shaped to provide a recess above the area where the cylindrical members are located to provide an empty area into which the cylindrical members can move. Each cylindrical member has an inner ball engaging and an outer end member engaging member. The outer end is shaped to correspond to the shape of the inner end of the end members and an inner end adjacent the ball element which is shaped to correspond to the shape of the surface of the ball element. The inner edge is also provided with two beveled edges both of which face axially outwardly with the innermost edge facing radially inwardly and the outermost edge facing radially outwardly. An annular valve seat and seal is also provided in the inner end and is similar in function and design to the valve seat and behind the seat seal used in the first embodiment.

When the annular enclosing and sealing member in the second embodiment is removed by being slid vertically off of the ball stem and out of valve body bore, the full extent of the recess in the valve body located above the cylindrical sealing elements will be opened and, due to the spherical shape existing between the cylindrical members and the inner end of the end members, the cylindrical members are free to rotate along that spherical surface into the recess in the valve body which allows the one-piece ball and stem element to be removed vertically from the valve body without disengaging the ball valve assembly from its in-line position. Likewise, it is also possible to remove one or both of the separate cylindrical members.

In both embodiments the body seals adjacent the end members and the annular enclosing and sealing members are sealed by full circle compression seals which further help eliminate problems associated with body seals under high and low temperature conditions.

These and other objectives of the present invention together with the following detailed explanation will be more clearly understood when read together with the exemplary embodiments of the present invention illustrated in the following drawings in which:

FIGS. 3A-3C are enlarged side views, partly in cross section and partly in elevation, showing the progressive movement of various parts of the ball valve assembly as the ball and stem is withdrawn from the ball assembly shown in FIG. 2.

DETAILED DESCRIPTION OF THE INVENTION

Figure 1:
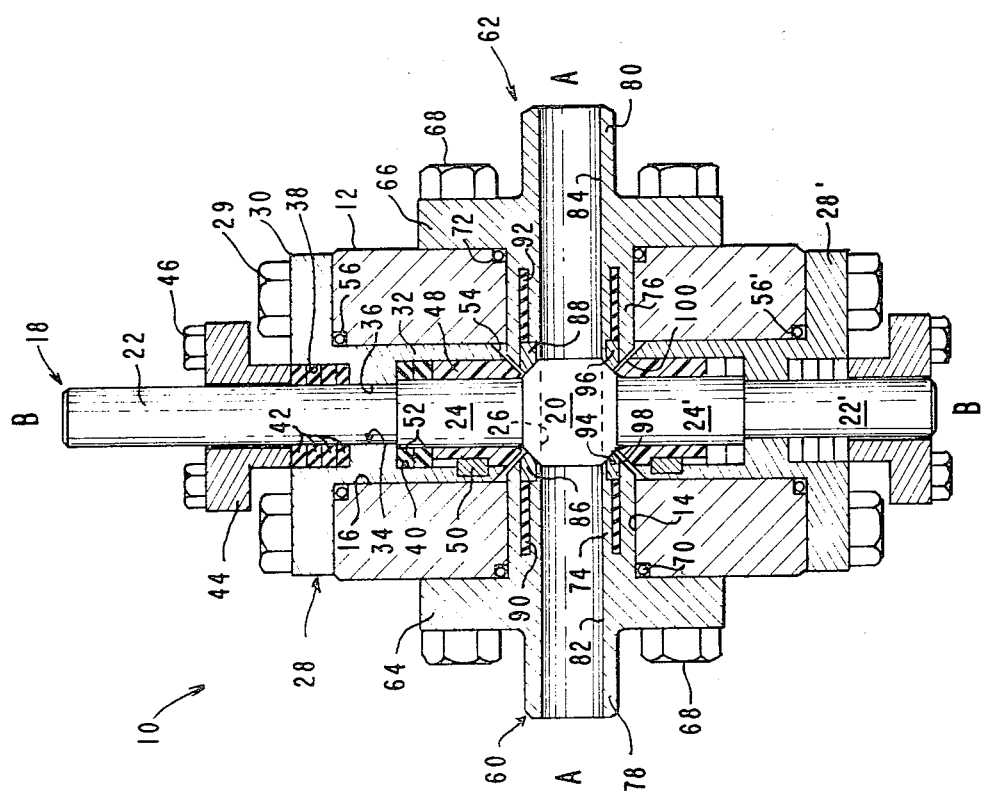
FIG. 1 is a side view, partly in cross section and partly in elevation, of an exemplary ball valve assembly according to one exemplary embodiment of the present invention.

Turning first to FIG. 1, a ball valve assembly according to the present invention is shown in one exemplary embodiment generally at 10 and includes a valve body 12 provided with a horizontal bore 14, which extends completely through valve body 12. Bores 14 and 16 are arranged perpendicularly with respect to one another and preferably are located centrally within valve body 12. The valve assembly 10 also includes a metallic ball assembly generally indicated at 18 comprised of a metallic ball 20 and a ball stems or shafts 22 and 22' which extend from opposite sides of all 20, and include trunnion bearings 24 and 24'.

While a one-piece ball and ball stem unit is shown herein it should be understood that the stem 22 and 22' can be either integral or separable from the ball 20 depending upon the preferences and dictates of the situation in which the ball valve is to be used. Ball 20 is also provided with a bore 26 which is concentric with axis A—A, the latter being concentrically located within bore 14. The ball stem 22 and 22' will be concentrically located along axis B—B of bore 16 and accordingly, will be perpendicular to axis A—A.

As shown in FIG. 1, the diameter of bore 16 is larger than the diameter of ball 20 which allows ball 14 to be removed therethrough.

The enclosure around ball stems 22 and 22' for sealing and supporting those shafts within bore 16 are identical and for that reason only one will be described. The shaft enclosure is comprised of a flanged annular enclosing member, generally indicated at 28, which includes an annular flange portion 30 extending radially away from axis B—B and a depending annular portion 32 which fits slidingly into bore 16 along axis B—B. The flanged annular enclosing member 28 is provided with a centrally located bore 36 having a diameter just slightly larger than the diameter of ball stem 22 and two areas 38 and 40 at the top and bottom of bore 36 where the diameter is enlarged substantially beyond the diameter of ball stem 22. When the flanged annular enclosing member 28 is inserted into bore 16 it will extend colinearly along axis B—B and about ball stem 22 which can rotate therein.

Within the larger diameter area 38 packing rings 42 are positioned and are brought into a sealing relationship with ball stem 22 by a sliding gland 44 which is itself held to the flanged annular enclosing member 28 by and convenient means such as bolts 46.

A cylindrically-shaped bearing 48 is located within the larger bore diameter area 40, which lies adjacent bore 14, and is held from rotating therein by key 50. As shown in FIG. 1, bearing 48 is in contact with trunnion bearing 24 on ball stem 22 and serves to rotatably support trunnion bearing 24 and sustain it against the force of differential fluid pressures on the ball 20 and also forms the rotational connection for the ball and stem element 18 within the ball valve assembly 10. As a solids-safe feature of this invention, bearing 48 is thrust against ball 20 by means of annular, solid-form springs 52 located behind bearing 48. These solid form springs could, for example, in normal temperature service, be comprised of natural or synthetic rubber or a like elastically compressible material. In high or low temperature service, however, these springs can be made of compressible graphite masses, spongy ceramic masses, or solid synthetic rubbers. By using these solid form springs, which are elastically compressible, the bearing 48 will not only be kept thrust inwards against ball 20 but the springs will also completely fill the space they occupy so that additional solids cannot enter that area and cause operational problems. In order to facilitate the functioning of this particular ball valve assembly, the inner end of the flanged annular enclosing member 28 together with a portion of bearing 48 lying against ball 20 are provided with an annular tapering conical surface 54 which faces outwardly in an axial direction and also tapers toward the inner end of enclosing member 28.

As indicated previously, the flanged annular closing member 28' which encloses and seals and generally supports ball shaft 22' is preferably constructed in an identical fashion to member 28 just described. Further, both flange members 28 and 28' employ full circle body seals 56 and 56' to seal the space between the flange members 28 and 28' and valve body 12. Both seals 56 are full circle seals (360°) and are ideally suited for use under high and low temperature conditions. There are many commercially available full circle forms for such seals that can be mechanically energized for very low temperature use or pressure energized for very high temperature use.

The main cross bore 14 is enclosed and sealed by turned end members 60 and 62 which are also preferably identically formed. Each end member 60 and 62 has a radially extending flange portion 64 and 66, respectively, which serves as the means by which bolts 68 can conveniently connect end members 60 and 62 to valve body 12. Here again, circular body seals 70 and 72 seal the connection between end member 60 and 62 and the body 12. End members 60 and 62 also respectively include an axially inwardly extending annular portion 74 and 76, of a predetermined length, designed slidingly to fit into bore 14 from opposite sides of valve body 12 so that the inner end thereof will come into contact with ball 20. Likewise, each end member 60 and 62 is respectively provided with an axially outwardly extending annular member 78 and 80 that serves as a mating connection for securing the pipes of the fluid line in which the valve is to be used to both sides of the ball valve assembly 10 in a convenient and conventional manner. Each end member 60 and 62 has a bore 82 and 84 respectively extending therethrough which together with bore 26 extending through ball 20 define the fluid conducting bore extending along axis A—A.

The inner end of end members 60 and 62 is provided with a valve seat 86 and 88 respectively as well as with behind-the-seat seals 90 and 92. It should be noted that the inner end of each of end member 60 and 62 is provided with a double beveled edge with the inner bevel facing axially outwardly along axis A—A and radially inwardly, that edge being indicated by reference numerals 94 and 96 respectively. The other edge, indicated by numerals 98 and 100, also faces axially outwardly along axis A—A but also faces radially outwardly with respect to axis A—A. It will be seen that in FIG. 1 that the seats 86 and 88 have portions of their inner end facing along each of these two edges with the edge which faces radially inwardly serving to provide the sealing and engagement with the outer spherically curved surface of ball 20. Likewise, it should be noted that the contact of seats 86 and 88 and ball 20 lies radially outwardly from the axis of bore 26 and ball 20. This not only assures proper sealing of ball 20 when the valve is closed and ball stem 22 has been rotated to position bore 26 perpendicularly across the flow path along axis A—A, it also seals the bearing and stem elements when fluid is flowing through bores 82 and 84. Valve seat 88 is preferably constructed from a metallic material but could also be made from a synthetic resin, such as polytetrafloroethylene, or of an elastomeric material. While the behind-the-seat seal 92, like springs 52, is preferably constructed from an elastically compressible solid material such as those listed above for spring 52.

The ball valve assembly just described is a relatively simple and efficient one to produce since the body 12 includes only two perpendicularly arranged cross bores and two pairs of identical turnings. By using these separate insert turnings, it is possible to make quick repairs once this embodiment is removed from its in-line position so that servicing is made very easy with a minimum of down time for the fluid line in which the valve assembly is used.

Turning now to FIGS. 2 and 3a-3c, a second preferred embodiment of the present invention is set forth. Since there are many elements from the embodiment shown in FIG. 1 that are also used in the embodiment shown here, like reference numerals have been used to indicate like parts.

This valve assembly, indicated generally by reference numeral 110, also preferably employs a one-piece ball and ball shaft arrangement is enclosed, sealed and rotatably supported in valve body 112 by end members 28 and 28' in a manner similar to that described for the embodiment shown in FIG. 1. Accordingly, further discussion of those sealing elements is not deemed to be essential for a complete understanding of this embodiment.

Valve body 112 is also provided with two bores, a horizontal cross bore 114 and a vertical bore 116 and, as was the case with bores 14 and 16 in the embodiment shown in FIG. 1, these cross bores are located perpendicularly with respect to one another preferably in the central portion of valve body 112. The portion of vertical bore 116 immediately above cross horizontal bore 114 is flared outwardly to form a tapering conical recess 118 which is defined by a radially inwardly slanting wall 120.

Figure 2:
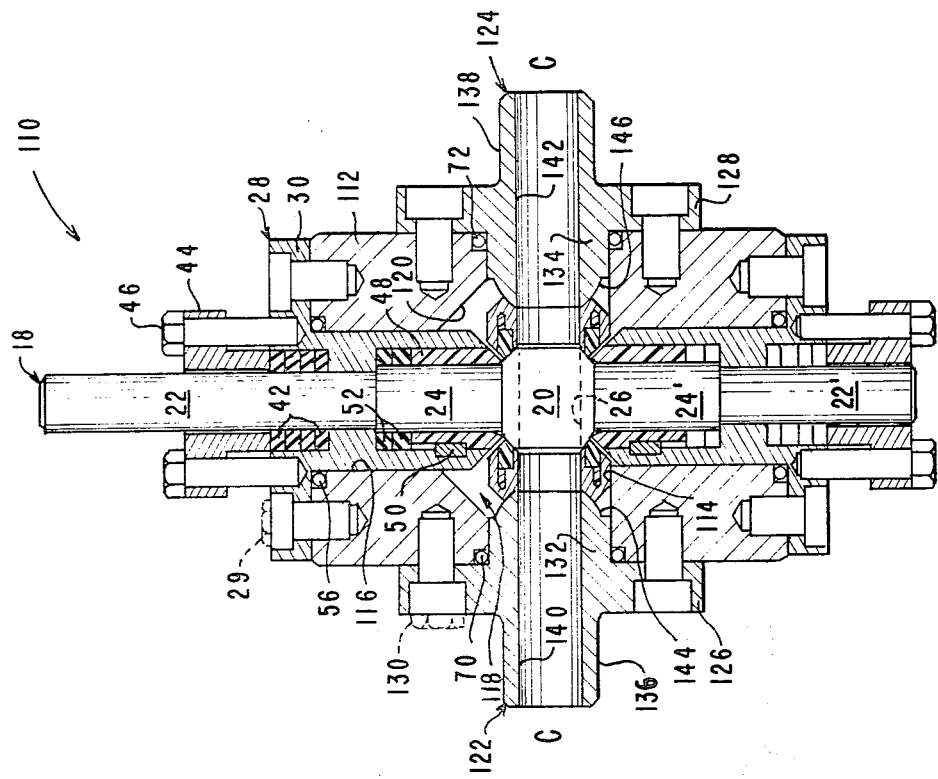
FIG. 2 is a side view, partly in cross section and partly in elevation, of another exemplary embodiment of a ball valve assembly constructed according to the present invention.

The embodiment shown in FIG. 2 also makes use of identically-shaped end members 122 and 124 which are also employed to enclose the main horizontal bore 114. Each end member 122 and 124 has a radially extending flange portion 126 and 128, respectively, which provides the means by which end members 122 and 124 can be secured to valve body 112 as, for example, by bolts 130. Also included are full circular body seals 70 and 72 similar to those previously described with respect to the embodiment shown in FIG. 1.

Each end member 122 and 124, respectively, incudes a portion 132 and 134 which extends a predetermined distance from flanges 126 and 128 designed to slidingly fit into bore 114 from the opposite sides of valve body 112. Likewise, each end member 122 and 124 is respectively provided with annual members 136 and 138 which extend outwardly from flanges 126 and 128 and serve as a mating connection for attachment to adjoining pipes in a conventional manner. Further, each end member 122 and 124 has an internal bore 140 and 142 which together with the internal bore 26 of ball 20 define a portion of the fluid conducting bore extending along axis C—C of valve assembly 110.

The inwardly extending portions 132 and 134 of end members 122 and 124 are provided with a generally spherical convex shape as 144 and 146. To complete the connection, two cylindrically shaped sealing members, shown generally at 148 and 150, are positioned between the inner ends of end members 122 and 124 and ball 20. Cylinders 148 and 150, best shown in FIGS. 3a-3c, are separate, self-contained elements and are provided with generally spherically shaped concave outer surfaces 152 and 154 so as to be compatible with the spherically shaped inner ends 144 and 146 of end members 122 and 124.

Cylindrical elements 148 and 150 also each have an inner end, generally indicated at 153 and 155 in FIG. 3c, which again is a double beveled edge, also provided with a valve seat 156 and 158, respectively, as well as behind-the-seat seals 160 and 162. Each seat is shaped so as to be compatible with the spherical outer surface of ball 20. The outer edge of elements 148 and 150, indicated at 168 and 170, respectively, also faces axially outwardly along axis A—A but faces radially outwardly as well with respect to axis A—A.

Cylindrical members 148 and 150 have an outer cylindrical surface 172 and 174 and each has a bore 176 and 178 extending therethrough. When in a sealing position between end members 122 and 124 and ball 20, as is shown in FIG. 3a, cylindrical elements 148 and 150 form a fluid tight seal between those end members and ball 20 with bore 26 together with the end member bores 140 and 142 and the bores 176 and 178 of cylindrical members 148 and 150 together define the fluid conducting bore extending within valve 110.

As was the case with the valve seats and the behind-the-seat seals shown in FIG. 1, valve seats 156 and 158 together with the behind-the-seat seals 160 and 162 are solid and the behind-the-seat seals are preferably compressible. In this embodiment as well, under normal temperature operations the behind-the-seal seals could be made of rubber or in extremely high or low temperature environments the seats and seals could be made of compressible graphite masses, spongy ceramic masses or special grades of synthetic rubbers. By making seals from compressible solid material not only are solids kept from getting within the cavities in which the seals are held but in addition, the compression keeps seats 156 and 158 thrust against ball 20 thereby assuring the proper sealing of ball 20.

Also, valve seats 156 and 158 can be comprised of metal, synthetic resins or plastics or elastomeric materials.

This particular embodiment allows for in-line servicing of the ball 20, its attached ball stem 22 as well as cylindrical elements 148 and 150. The insertion or removal of ball 20 is shown in the sequences set forth in FIGS. 3b and 3c.

In FIG. 3b, ball 20 has either been slightly raised in a vertical condition or is near the bottom point when being inserted and shows cylindrical members 148 and 150 in the position they will attain as they rotate along the spherically-shaped inner end surfaces 144 and 146 of end members 122 and 124. The bottom portion of cylindrical elements 148 and 150 when in their normal position, as in FIG. 3a, rest on a portion of valve body 112 with the upper portion facing toward recess 118. Thus, as shown in FIG. 3b, following removal of the enclosing member 28 as ball 20 is raised upwardly, cylindrical elements 148 and 150 rotate about the inner ends of end members 122 and 124 and move upwardly into recess 118. Recess 118 is dimensioned so that cylindrical elements 148 and 150 can rotate into it a sufficient distance to allow the widest portion of ball 20 to pass between the most forward portion of seats 156 and 158 and that position is shown in FIG. 3b. In FIG. 3c, ball 20 has cleared cylindrical elements 148 and 150.

The process of inserting the ball 20 in its attached stem 22 would start with the position as shown in FIG. 3c with the lower stem 22' initially passing through the area between elements 148 and 150 which can be held in the position as shown to allow the ball 20 to pass between the upper portions of seats 156 and 158. As ball 20 is lowered, it will contact the inner spherical edge of cylindrical elements 148 and 150 causing them to rotate in an opposite direction from that described previously about the spherically-shaped inner surface of end members 122 and 124 until the final position as shown in FIG. 3a is reached. At that point, gentle rotation of ball stem 22 will correctly seat cylindrical members 148 and 150, and in particular seats 156 and 158, on ball 20 and on end members 122 and 124, respectively.

It is well understood that to maintain proper seating in a valve, the valve seats must be brought into a tight engagement against the spherical outer surface of ball 20. Thus, there is a specific force needed to hold the seats against the spherical surface of ball 20 in order to prevent leakage.

To some extent, the fluid which is under high pressure will tend to permeate between the exterior surface of ball 20 and the corresponding concave spherical seat surface. If the fluid pressure is such that it exceeds the surface pressure along the contact area between the valve seat and the ball, the force applied by the fluid pressure may exert such a force on the seat surface that would be sufficient to effectively move the seat away from the ball enabling fluid to leak through the passageway formed thereby. Accordingly, it is apparent that under high pressure situations, the surface pressure existing between the ball and the seat must be at least equal to or greater than the fluid pressure on the inlet side of the valve in order to prevent leakage past the ball seat junction especially when ball 20 is turned to its closed position. One way to accomplish that is to continuously have an extremely large surface pressure higher than the pressures expected to be experienced during use of the valve. However, this is undesirable from an operability standpoint since life of the valve seat is decreased.

Figure 4:
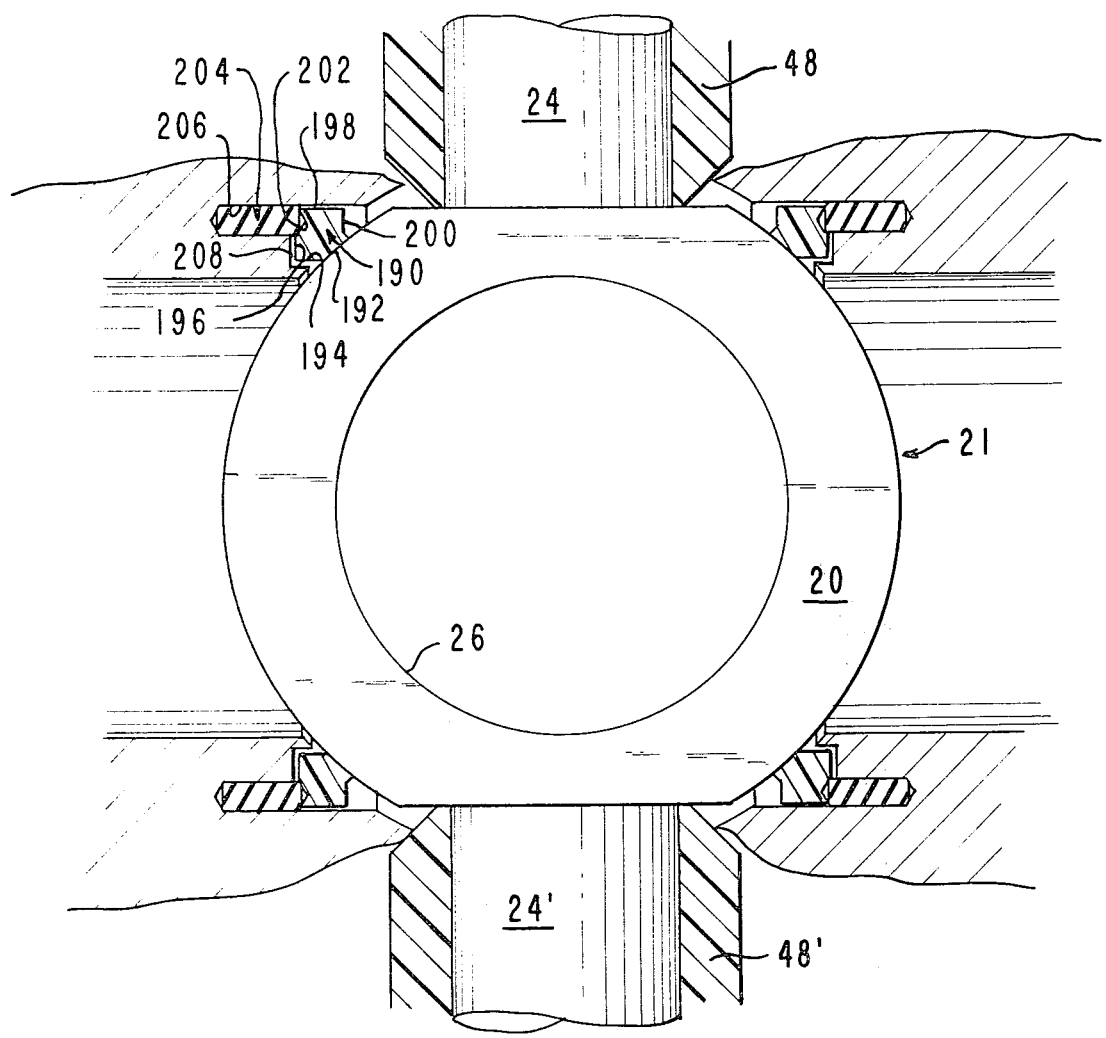
FIG. 4 is an enlarged detailed view, partly in cross section and partly in elevation, of an improved valve seat according to the present invention.

A modified valve seat configuration is shown in FIG. 4 which can be used with valves, including those described hereinbefore, to overcome these sealing problems to provide a very tight seal even under varying pressure conditions.

Ball 20 is shown together with its internal bore 26 as is trunnion portion 24 and 24' which is held by bearings 48 and 48'. The portion of the valve body or body insert structure which lies adjacent the spherical outer surface 21 of valve 20 retains a valve seat 190 which includes a concave spherically-shaped seat surface 192 having a predetermined size equal to an area designated by the letter Y. In addition, valve seat 190 has an exposed inner surface 194 and an exposed rear surface 196. Rear surface 196 also has a predetermined size equal to an area designated by the letter X. Further, valve seat 190 has two unexposed retaining surfaces, namely top surface 198 and front surface 200. A conically shaped recess 202 located above the exposed rear surface 196 for receiving the forward end of the behind-the-seat seal 204 and the remainder of the behind-the-seat seal 204 occupies the total space of a recess 206 provided in the valve structure lying adjacent ball 20.

Located between the portion of the valve lying adjacent the seat and surfaces 194 and 196 of the valve seat 204 is an annular, generally L-shaped recess or passage 208 which extends or passes around the rear and bottom surfaces 196 and 194 of valve seat 190 to ultimately open into the fluid conducting bore within the ball valve. Because of this passageway, the inner and rear surfaces of valve seat 190 are exposed to the fluid pressure within the valve.

The behind-the-seat seal 204 has an inner diameter "D" while the concave spherical surface 192 of seat 190 has an outer diameter "d." By having the inner diameter of the behind-the-seat seal 204 "D" larger than the outside diameter "d" of the valve seat's concave spherical surface 192, the area X of rear surface 196 will be at least slightly larger than area Y of the concave spherical surface of seat 190. Accordingly, fluid pressure acting on rear surface 196 through passageway 208 creates a small resultant force tending to press valve seat 190 onto the outer surface of ball 20 with a force that will always tend to be slightly greater than the fluid pressure within the fluid passageway. Thus, as fluid pressure increases, that small resultant force likewise proportionally increases, thereby assuring that variations in fluid pressure will not create a situation where leakage will occur between the ball 20 and valve seat 190. Further, the resultant force can be accurately controlled by carefully selecting the size of areas X and Y since the size of the resultant force can be controlled by the difference therebetween.

While the invention has been described in connection with what is presently conceived to be the most practical and preferred embodiments, it is to be understood that the invention is not to be limited to the disclosed embodiments but on the contrary, is intended to cover various modifications and equivalent arrangements included within the spirit and scope of the appended claims, which scope is to be accorded the broadest interpretation of such claims so as to encompass all such equivalent structures.

I claim:

1. A ball valve assembly comprising: a valve body having means defining two orthogonally positioned bores extending therethrough, first and second end members adapted to be secured within one of the bores in said body from opposite sides thereof, each of said first and second end members having means defining a bore extending therethrough, and a circularly recessed inner end having means defining a recess therein, a ball having a spherically curved outer surface for cooperating with the circularly recessed inner end of said first and second end members and means defining a bore extending through said ball adapted to cooperate with the bores of said first and second end members to define the fluid conducting bore of said valve, a ball supporting shaft extending away from opposite sides of said ball in a generally perpendicular direction with respect to said fluid conducting bore, each shaft including a trunnion bearing portion adjacent said ball, enclosure and sealing means for enclosing and sealing each shaft within the other of said bores in said body, said enclosure and sealing means including an integral bearing tapering to a thinned area at first end thereof for rotatably engaging said trunnion bearing portions, and spring means positioned behind said bearing at a second end thereof for urging said bearing thinned area directly against said ball, and sealing means secured within the recess on the inner end of said first and second end members for sealing the area between the ball and the inner ends of said end members.

2. A ball valve assembly as in claim 1 wherein said ball and shafts attached thereto comprise a one-piece structure.

3. A ball valve assembly as in claim 1 wherein said ball is comprised of metal.

4. A ball valve assembly as in claim 1 wherein said bearing and spring means are comprised of a solid material.

5. A ball valve assembly as in claim 1 wherein said spring means comprise elastically compressible solid form springs.

6. A ball valve assembly as in claim 5 wherein said solid form springs are comprised of compressible graphite.

7. A ball valve assembly as in claim 5 wherein said solid form springs are comprised of rubber.

8. A ball valve assembly as in claim 5 wherein said solid form springs are comprised of a spongy ceramic material.

9. A ball valve assembly as in claim 1 wherein said sealing means includes a valve seat and a behind-the-seat seal for thrusting the valve seat against the surface of said ball.

10. A ball valve assembly as in claim 9 wherein said valve seat and behind-the-seat seal are comprised of a solid form material.

11. A ball valve assembly as in claim 10 wherein said valve seat is comprised of a metallic material.

12. A ball valve assembly as in claim 10 wherein said valve seat is comprised of a plastic material.

13. A ball valve assembly as in claim 10 wherein said valve seat is comprised of an elastomeric material.

14. A ball valve assembly as in claim 10 wherein said valve seat is comprised of a synthetic resin.

15. A ball valve assembly as in claim 10 wherein said valve seat is comprised of polytetrafluroethylene.

16. A ball valve assembly as in claim 10 wherein said behind-the-seat seal is comprised of an elastically compressible material.

17. A ball valve assembly as in claim 10 wherein said behind-the-seat seal is comprised of rubber.

18. A ball valve assembly as in claim 10 wherein said behind-the-seat seal is comprised of synthetic resin.

19. A ball valve assembly as in claim 10 wherein said behind-the-seat seal is comprised of compressible graphite.

20. A ball valve assembly as in claim 10 wherein said behind-the-seat seal is comprised of a spongy ceramic material.

21. A ball valve as in claim 1 wherein said valve further includes at least one body seal between said valve body and each of said end members and said enclosure and sealing means.

22. A ball valve as in claim 21 wherein each body seal comprises a full circle seal.

23. A ball valve comprising, in combination
a valve body having means defining two perpendicularly positioned passages at least one of which extends through said body;
a pair of end members for enclosing the opposite sides of the passageway extending through said body, each end member comprised of a hollow conduit having a radially extending flange thereon said flange being positioned so that a portion of the conduit extends beyond at least one side of the flange and is adapted to be inserted into the passageway, the inner end of said end member having a generally spherically curved shape;
a ball having means defining a bore extending therethrough and having at least one stem extending therefrom, said stem being perpendicular to the bore in said ball;
enclosure and sealing means for enclosing and sealing the valve stem rotatably within the other passage; the other passage having a dimension larger than the diameter of said ball;
a cylindrical member positioned between said ball and each of said end members for connecting together said ball and the inner ends of said end members thereby defining together with the bore in said ball and the hollow conduits of said end members a fluid flow path through said valve, said cylindrical member having another end shaped to correspond with the inner end of said end members and an inner end shaped to correspond to the spherically shaped sealing means disposed between said ball and said cylindrical member for creating a fluid tight seal therebetween, and means defining a conically shaped, annular recess in said valve body extending above said cylindrical member and radially outwardly from the inner end of said enclosing and sealing means so that after removal of said enclosing and sealing means said cylindrical members can rotate along the curved inner end of said end members allowing removal of said ball.

24. A ball valve as in claim 23 wherein said valve stem includes a trunnion bearing and said enclosure and sealing means includes bearing means for rotatably engaging said trunnion bearing, spring means positioned behind said bearing means for urging said bearing means against said ball.

25. A ball valve as in claim 24 wherein said spring means is comprised of a solid material.

26. A ball valve as in claim 23 wherein the inner end of said cylindrical member includes means defining an annular recess and said sealing means in said cylindrical member comprises an annular valve seat positioned within a portion of the recess in the inner end of said cylindrical member and a behind-the-seat seal positioned within the remaining portion of the annular recess.

27. A ball valve as in claim 26 wherein said sealing means is comprised of a solid material.

28. A ball valve as in claim 26 wherein said behind-the-seat seal is comprised of an elastically compressible material.

* * * * *